(12) United States Patent
Larose et al.

(10) Patent No.: US 10,397,117 B2
(45) Date of Patent: Aug. 27, 2019

(54) SYSTEM AND METHOD FOR PACKET DISTRIBUTION ON A NETWORK

(71) Applicant: SANDVINE INCORPORATED ULC, Waterloo (CA)

(72) Inventors: Kyle Mathieu Larose, Waterloo (CA); Deepu Rajan, Waterloo (CA); Vinay Padma, Brampton (CA)

(73) Assignee: Sandvine Corporation, Vancouver, BC (CA)

( * ) Notice: Subject to any disclaimer, the term of this patent is extended or adjusted under 35 U.S.C. 154(b) by 10 days.

(21) Appl. No.: 15/451,644

(22) Filed: Mar. 7, 2017

(65) Prior Publication Data

US 2017/0264550 A1 Sep. 14, 2017

Related U.S. Application Data

(60) Provisional application No. 62/306,405, filed on Mar. 10, 2016.

(51) Int. Cl.
*H04L 12/803* (2013.01)
*H04L 12/851* (2013.01)
(Continued)

(52) U.S. Cl.
CPC .......... *H04L 47/125* (2013.01); *H04L 45/245* (2013.01); *H04L 47/24* (2013.01);
(Continued)

(58) Field of Classification Search
CPC ..... H04L 45/245; H04L 47/125; H04L 47/24; H04L 67/1029; H04L 69/14; Y02D 50/30
See application file for complete search history.

(56) References Cited

U.S. PATENT DOCUMENTS 8,787,400 B1 * 7/2014 Barth ................. H04L 45/24
370/419
9,705,781 B1 * 7/2017 Medved ............... H04L 45/02
(Continued)

FOREIGN PATENT DOCUMENTS

EP 0892531 A2 1/1999

OTHER PUBLICATIONS

Wu et al., "NetPilot: Automating Datacenter Network Failure Mitigation", Aug. 13, 2012, pp. 419-430, ACM, 2 Penn Plaza, Suite 701, New York, New York, 10121-0701, United States of America, XP058008052.
(Continued)

*Primary Examiner* — Asad M Nawaz
*Assistant Examiner* — Saad A. Waqas
(74) *Attorney, Agent, or Firm* — Gowling WLG (Canada) LLP; Neil W. Henderson

(57) ABSTRACT

The disclosure is directed at a system and method for packet distribution in a network. After receiving a data packet, at least one network function associated with the packet, at least one link aggregation group (LAG) associated with the packet, and a variance associated with a plurality of links within the at least one LAG are determined. A determination as to whether the variance is above a pre-determined threshold is then performed and if the variance is above the threshold, a path for the packet based on capacity associated with each of the plurality of links is determined. Otherwise a path based on capacity of each of a plurality of network function instances associated with the at least one network function is determined.

14 Claims, 7 Drawing Sheets

(51) Int. Cl.
     *H04L 29/08*        (2006.01)
     *H04L 12/709*      (2013.01)
     *H04L 29/06*        (2006.01)

(52) U.S. Cl.
     CPC .......... H04L 67/1029 (2013.01); H04L 69/14 (2013.01); *Y02D 50/30* (2018.01)

(56) References Cited

U.S. PATENT DOCUMENTS

| | | | |
|---|---|---|---|
| 2003/0235151 A1 | 12/2003 | McClellan | |
| 2004/0136379 A1* | 7/2004 | Liao | H04L 47/10 370/395.21 |
| 2009/0178088 A1* | 7/2009 | Liu | H04N 7/17336 725/87 |
| 2013/0286846 A1* | 10/2013 | Atlas | H04L 45/34 370/236 |
| 2015/0026321 A1* | 1/2015 | Ravinoothala | H04L 45/245 709/222 |
| 2017/0126478 A1* | 5/2017 | Morris | H04L 41/0654 |

OTHER PUBLICATIONS

European Patent Office, Extended European Search Report on EP Patent App. No. 17160184.2, dated Jun. 28, 2017.

\* cited by examiner

SYSTEM AND METHOD FOR PACKET DISTRIBUTION ON A NETWORK

CROSS-REFERENCE TO OTHER APPLICATIONS

This application claims the benefit of U.S. Patent Provisional Application No. 62/306,405, filed Mar. 10, 2016, which is incorporated herein by reference.

FIELD

The present disclosure relates generally to a system and method for packet distribution on a computer network. More particularly, the present disclosure relates to load-balancing on a computer network between primary destinations and intermediary links.

BACKGROUND

A network provider, such as an Internet Service Provider (ISP), operates a network that delivers Internet connectivity to subscribers. A general model of a network provided by a network provider includes a core network and an access network. Subscribers connect to an access network, and traffic is exchanged with hosts on the Internet, via a core network. Traffic is generally routed through various network devices between the access network and the core network, for example, switches, firewalls, deep packet inspection devices, and the like, in order to review and/or appropriately direct the traffic.

As traffic is routed to a destination, network providers may provide load-balancing to the traffic in order to balance traffic through the plurality of network devices, in an effort to reduce the likelihood of any one network device becoming overburdened.

As Internet traffic content becomes more congested and more complex, there remains a need for improved systems and methods for distributing packets and load-balancing on a network.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for packet distribution on a network, the method including: receiving a packet from a traffic flow; determining at least one network function associated with the packet; determining at least one link aggregation group (LAG) associated with the packet; determining a variance associated with a plurality of links within the at least one LAG; determining whether the variance is above a pre-determined threshold; if the variance is above the threshold, determining a path for the packet based on capacity associated with each of the plurality of links; otherwise determining the path based on capacity of each of a plurality of network function instances associated with the network function.

In a particular case, the path for the packet comprises a network function instance associated with the packet.

In another particular case, determining the path for the packet based on capacity associated with each of the plurality of links may include: selecting a LAG of the at least one LAGs; determining whether the selected LAG needs a predetermined criteria; if the LAG is least loaded, determining if there is a tie associated with the network function instances associated with the LAG; if there is a tie, selecting a highest capacity network function instance associated with the LAG; if there is no tie, selecting a least loaded network function instance associated with the LAG; if the LAG does not meet predetermined criteria, selecting a new LAG if there is more than one LAG. In another case, a round-robin selection is performed to determine a next instance for the distribution of a packet. In another case, if there is a tie for the highest capacity network function instance, reply with a tie, otherwise, reply with an instance.

In yet another case, determining the path based on capacity of each of the plurality network function instances may include determining a load for each of the plurality of network function instances, determining whether there is a tie for a least loaded network function instance; if there is a tie, selecting the network function instance with a higher capacity; otherwise selecting the network function instance with the least load.

In still another case, the method may further include determining any constraints associated with the packet.

In another aspect, the present disclosure provides apparatus for packet distribution on a network including a controller for determining at least one network function associated with a received data packet, determining at least one link aggregation group (LAG) associated with the received data packet, determining a variance associated with a plurality of links within the at least one LAG, and determining whether the variance is above a pre-determined threshold; a balance-using LAG module for determining a path for the received data packet based on capacity associated with each of the plurality of links if the variance is above the pre-determined threshold; and a balance-using network function module for determining the path based on capacity of each of a plurality of network function instances associated with the at least one network function if the variance is below a predetermined threshold.

In a particular case, the apparatus further includes a rules module for initiating rebuilding of a rules tables based on the determined path. In another case, the apparatus includes a network processing unit associated with the controller, the network processing unit for receiving the data packet. In a further particular case, the apparatus further includes a memory component.

In another aspect, the present disclosure provides a system for packet distribution on a network including a set of network processing units for receiving data packets; a set of packet distribution apparatus, each of the set of packet distribution apparatus associated with one of the set of network processing units; a set of switches connected to each other via link aggregation groups (LAGs); and a set of network functions connected to the set of switches; wherein each of the set of packet distribution apparatus includes: a controller for determining at least one network function associated with a received data packet, determining at least one LAG associated with the received data packet, determining a variance associated with a plurality of links within the at least one LAG, and determining whether the variance is above a pre-determined threshold; a balance-using LAG module for determining a path for the received data packet based on capacity associated with each of the plurality of links if the variance is above the pre-determined threshold; and a balance-using network function module for determining the path based on capacity of each of a plurality of network function instances associated with the at least one network function if the variance is below a predetermined threshold.

In a particular case, the set of network functions includes a set of network function instances. In another case, each of the set of network processing units are connected to the set of switches via a high speed data link. In a further case, the set of network processing units receive data packets from the Internet.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
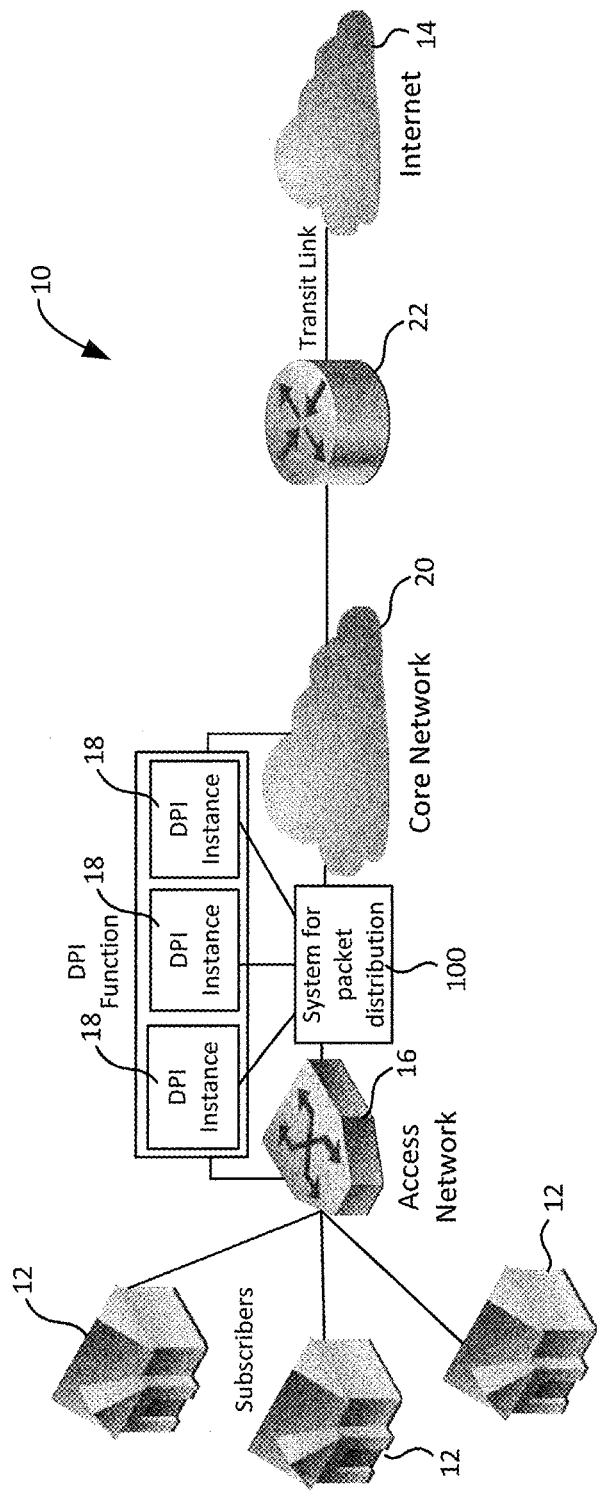
FIG. 1 is an example environment for a system for packet distribution.

The following description, with reference to the accompanying drawings, is provided to assist in a comprehensive understanding of example embodiments as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of known functions and constructions may be omitted for clarity and conciseness.

The terms and words used in the following description and claims are not limited to the bibliographical meanings, but, are merely used to enable a clear and consistent understanding. Accordingly, it should be apparent to those skilled in the art that the following description of embodiments is provided for illustration purpose only and not for the purpose of limiting the invention as defined by the appended claims and their equivalents.

In the disclosure below, various terminology is generally used as follows:

Network Function (NF): A device or group of devices providing functionality within a network, typically by acting on packets. For example, firewalls, Deep Packet Inspection (DPI) devices, content caches, file servers, web servers, or the like.

Network Function Instance (NFI): A specific instance of a network function. For example, the DPI function may be provided by various (for example 3) DPI devices in a network. Each of these devices may be considered one instance, generally running in parallel.

Network Processing Unit (NPU): A device tailored to efficiently perform operations on packets in a network.

Load-balance: To distribute load across a network, and, in some cases, across a set of network function instances.

Load-balancer: A device which sends packets to network function instances based on input from load-balancing decision process and the contents of a packet. Often such functionality is provided by an NPU.

Load: A measurement of how busy a network device is. A 100% load generally means that the device cannot be assigned any more work, and may be considered overloaded.

Capacity: The amount of work that can be assigned to a device before it reaches 100% load. Packet: A piece or chunk or subdivision of data. Typically, a stream of communication/data over the Internet is broken up into a plurality of packets.

Internet Protocol (IP): A method of addressing devices in a network.

IP Address: A unique identifier indication of the location of a device in a network.

Data Path: Performance-critical portion of the network device responsible for forwarding packets.

Link Aggregation Group (LAG): A collection of links forming a single logical link. LAGs are typically used to increase the amount of traffic that can be sent between two devices.

Flow: A sequence of packets between two processes running on one or two devices. A flow is typically identified by the source and destination IP address in conjunction with further information related to the processes on the two devices responsible for the traffic. For example, the communication which occurs between a web server and a web browser may be considered a flow.

Subscriber IP address: The IP address corresponding to the subscriber for a given packet. This may be the source or destination IP address depending on the direction of the packet. If the packet is received from the subscriber, then the source IP address is the subscriber IP address. If the IP address is received from the internet, then the destination IP address is the subscriber IP address. Various means may be used to determine this, such as a subnet lookup, associating a physical interface with a direction, or the like.

Generally, the present disclosure provides a method and system for the distribution of packets, for example, Internet Protocol (IP) packets. The method and system are intended to use adaptive multi-criteria mapping to load balance packet flow in a network. The embodiments herein are intended to address problems that were identified in conventional load-balancing. For example, load-balancing may not be as effective when a primary load-balancing decision among network function instances affects the distribution of load on intermediate link aggregation groups (LAG). Load-balancing may be complicated when the performance of network function instances varies within a set of network function instances.

Generally, the system and method detailed herein provide for the distribution of packets beginning with receiving a packet from a traffic flow. Once the packet is received, the system determines at least one network function to be associated with or performed on the packet. The system also determines LAGs associated with the packet. A variance is determined based on the LAGs and the variance is compared to a pre-determined threshold. If the variance is above the threshold, the system may determine a load-balanced path for the packet based on available capacity associated with the LAGs. If the variance is below the threshold, the system may determine the path based on the capacity of each of a plurality of network function instances able to perform the network function associated with the packet.

Generally, it is intended that the method for the distribution of packets assigns weights to network function instances. The weights may capture the relative performance of each of the plurality of network function instances. These weights may then be factored into, for example, a hash-based load-balancing method.

Further, the method may determine how the hashes, or packet values, chosen to go over one of a plurality of LAGs affect the distribution of traffic over each LAG. This knowledge is preferably provided as feedback to the method, which chooses the hashes crossing a given LAG which is intended to provide for the packets to be load-balanced.

In one embodiment, the method described herein is intended to load-balance to a set of network function instances based off of fixed packet data such that the load on intermediate LAGs is optimized.

Some conventional systems use load-balancing to provide horizontal scaling for various switches and network traffic devices and platforms, for example, Deep Packet Inspection (DPI) devices, firewalls, content caches, and the like. Switches and other network traffic devices need to distribute traffic to ultimate destinations with differing performance characteristics. Conventionally, systems used a simple hash process to provide for load-balancing without taking into account load-balancing functionality at intermediate hops or stages.

FIG. 1 illustrates an example of a network 10. A plurality of subscribers 12 access the Internet 14 via an Internet Service Provider (ISP). The ISP provides at least one access network 16 to the plurality of subscribers 12. The access network 16 may be a wireline access network or wireless network.

A plurality of network function instances 18, such as a plurality of DPI instances, may be located at or between the access network 16 and a core network 20. The core network 20 may connect to the Internet 14 via a transit link 22. A system for packet distribution 100 may be located between the access network and core network and may load balance the packets through the plurality of network instances 18, such as the plurality of DPI instances.

A cost of the access network is the capital cost associated with laying cable and adding network equipment. As such, access networks may be built with over-subscription; that is, less capacity in the access network than the sum of capacity for each subscriber. As such, it is key to manage the flow of packets in the network to reduce the number of network function instances working at capacity in order to benefit from the full capacity of each of the network function instances.

It will be understood that different network platforms have different performance characteristics. For example, a newer traffic switch may be expected to handle 1.5 times the bandwidth of an older version. Users expect these devices to interoperate via horizontal scaling. Horizontal scaling allows users to connect multiple devices together in a cluster. A cluster is typically expected to perform at roughly the level of the sum of its individual components' performance. For example, if a switch C can handle 90 Gbps of traffic, and a switch A can handle 60 Gbps of traffic, then a cluster comprising one switch A and one switch C should be able to handle 150 Gbps of traffic.

To achieve horizontal scaling across cluster devices, load-balancing functionality distributes traffic across a set of destinations according to various load-balancing criteria. Each platform has a number of destinations chosen to optimize for its processing characteristics.

For example, a switch C may have 36 destinations, while a switch A may have 18. Thus, the cluster in this example has a total of 54 destinations.

Traffic may be load-balanced on a per-packet basis. That is, for each packet the load-balancer decides where to send the packet. One constraint placed on such load-balancing tends to be that all packets for a given flow must be sent to the same network function instance. This constraint is intended to serve two purposes. First, it is intended to reduce or prevent reordering, which may impact the ability of the ultimate destination to process the packets. Second, some network functions require that all traffic for a given flow be handled by the same network function instance. Further, some network functions require that all traffic for a given subscriber IP address be handled by the same network function instance. Thus, the load-balancer is configured to ensure that all traffic for a given subscriber IP address is sent to the same network function instance.

In some conventional systems the load-balancing functionality load-balances to destinations by mapping the packet to a contiguous range of values via a hash of fields in the packet. Each value in the range is associated with a destination.

For example, the load-balancer may use two mappings to come to a load-balancing decision. For the first mapping, the load-balancer may use various pieces of information from the packet to build an index—by mapping the packet to an index. Typically, in order to meet the flow ordering and subscriber IP constraints mentioned above, the load-balancer may use packet data that is constant for a given subscriber IP address, such as a part of the IP address itself. That index serves as the input to the second mapping, which maps the number or value assigned to a packet to a destination, for example, a network function instance. The composition of these mappings tells the load-balancer which device to send to for a given packet.

For example, the load-balancer may map a packet to value 10 within the range [0, 255], using an 8-bit field of the packet. Generally, a range of [0,255] may be selected as the range is associated with an 8-bit value, which is intended to simplify hardware limitations and provide for a range that has a length of 256 which would be the number of unique values in an 8-bit number. Other ranges may be selected. The mapping may be determined by parameters associated with the packet, for example, the contents of the packets, the bottom 8 bits of the outer source IP Address, or the like.

The first mapping is generally performed in order to assign a value to the packet. A second mapping may then be performed to map the value to a destination. The load-balancer may then consult a secondary mapping of [0, 255] to the set of destinations, which gives the value 5. This result tells the load-balancer that it should send the packet to the destination represented by 5.

Traffic patterns on the Internet tend to distribute evenly over the hash function, so as long as the load-balancer distributes the hash values well over the destinations, traffic may be considered to be effectively load-balanced at the load-balancer. Note, however, that even though traffic may be distributed evenly at the load-balancer, it may not distribute evenly at intermediate links or devices, for example LAGs, between the load-balancer and the packet's final destination. Poor distribution may occur when the load-balancer partitions the set of input into the hash function, such that the intermediate links sees different subsets of the hash input.

The simplest method of distribution in load-balancing maps the range of hash values such that every destination has an equal number of mappings. This works well when each destination has the same performance characteristics.

However, consider an example referred to above where the switch C has 1.5 times the performance of switch A and 2 times as many interfaces or links as switch A. So, switch C has per-link performance that may actually be less than that of switch A. A link on switch C can handle ¾ of the amount that could be handled by switch A. Under an even assignment process, ¼ of the hashes will be assigned to links on switch A, and ¾ will be assigned to links on switch C. This means that each link on switch C will receive the same amount of traffic as on switch A whereby switch C will receive overall twice as much traffic as switch A.

Now consider the case where switch C is receiving as much traffic as it possibly can: 90 Gbps such that sending any more traffic to the switch would push it beyond its limits. Since it is receiving twice as much traffic as switch A, switch A will receive 45 Gbps. This is less than its maximum of 60 Gbps. Indeed, the cluster has capped out at 135 Gbps, despite its capacity theoretically being 150 Gbps.

A simple solution to this problem would be to have the load-balancer allocate ¾ as many hashes to a link on switch C as allocated to a link on switch A.

However, there may be other requirements on load-balancing functionality. For example, at various points in a cluster, the cluster may use LAGs to expand the capacity of inter-device communication. LAGs may use a similar hashing mechanism as the main load-balancer to distribute traffic over their constituent links.

The main load-balancer may use the same information in the packet to construct its hash as the LAGs. The topology of the cluster may mean that traffic from one device to another may not cross a given LAG. Since only certain hashes will be sent to a given device, this means that the LAG may not see traffic from every hash. This may pose a problem for load-balancing.

The LAG not seeing traffic from every hash means that the hash mechanism may not distribute the packets evenly over the constituent links. Indeed, some links may not be used at all, which may lead to very poor performance.

In order to achieve an improved or more optimal performance, in one embodiment, the system detailed herein is intended to:

Ensure traffic is distributed appropriately amongst the network function instances associated with the packet; and Ensure traffic is distributed appropriately over the intermediate LAGs.

Generally speaking, an embodiment of the system builds a load-balancing rule table in a Network Processing Unit (NPU), which includes a controller or processor that dynamically reorganizes its decisions based on the current state of the table and its knowledge of how the decisions affect the load on the intermediate LAGs.

The rule table may be initially built using a method described herein. The input to the table may include a set of network function instances, a topology of the network connecting them, weights of each instance, constraints associated with packet distribution, and the like. A controller is intended to update the table dynamically in response to network function instances coming online or going offline (for example, if there is a failure, more instances are added to increase capacity, or the like). The controller may use the weight of each instance to approximate the load added by assigning a hash.

A goal of load-balancing is generally to distribute internet traffic from multiple high speed links to a set of network function instances in a balanced manner. This distribution is typically subject to a constraint that all packets with the same property, for example, subscriber IP address, flow, or the like, must be sent to the same network function instance. For example, all packets coming from the Internet with a given destination Internet Protocol address must be sent to the same network function instance. Further complicating matters is that different network functions may have different maximum capacities.

Another goal of load-balancing is to minimize the number of network function instances which need to be deployed. For example, suppose that one wanted to process 100 Gbps of traffic for a given network function, and that each network function instance within that function may be able to handle 5 Gbps of traffic. If the load were optimally distributed, then only 20 network function instances would be required. On the other hand, if one seventh of the devices were each given 5 Gbps, and the other six sevenths were given 2.5 Gbps each, then 55 network function instances would be required.

Better load-balancing reduces the number of required network function instances by allowing the instances to achieve the desired amount of processing. This, in turn, reduces the operational and capital costs of providing the network functions. Reducing the number of instances is intended to reduce the amount of equipment required, which would result in less capital outlay, less power consumption, less overhead to maintain and configure, and less chance of a device failing, due to overloaded conditions.

In order to scale the number of high speed links being handled, multiple devices may work in conjunction to provide intersection functionality and network functionality. These devices may be connected by, for example, a set of Ethernet switches.

Each Ethernet switch may be connected to other Ethernet switches through a series of links aggregated into one logical link called a LAG. Traffic traversing from one switch to another takes a particular link within the LAG, subject to similar packet content constraints as the primary load-balancing functionality described above. In particular, packets from a given flow may not be reordered, thereby constraining the possible distribution options substantially, because the switch may not simply select the least loaded link, but may use characteristics of the packet to identify the flow and constrain the load-balancing of the packet. Similar to how load-balancing is intended to reduce the number of required network function instances, load-balancing may further distribute traffic over a set of connected links to reduce the number of required links, thereby reducing the cost of the deployment.

A problem may arise when the contents of the packet being used to determine the network function instances load-balancing are also used to determine the link distribution. In this case, the load-balancing decision, which determines which set of links are taken, may not provide the set of links with a full or complete set of packet data on which to load-balance.

The system and method provided herein are intended to provide a mechanism to balance the distribution of load over both a primary destination, for example, a network function instance, as well as intermediate links, for example links aggregated into LAGs.

Figure 2:
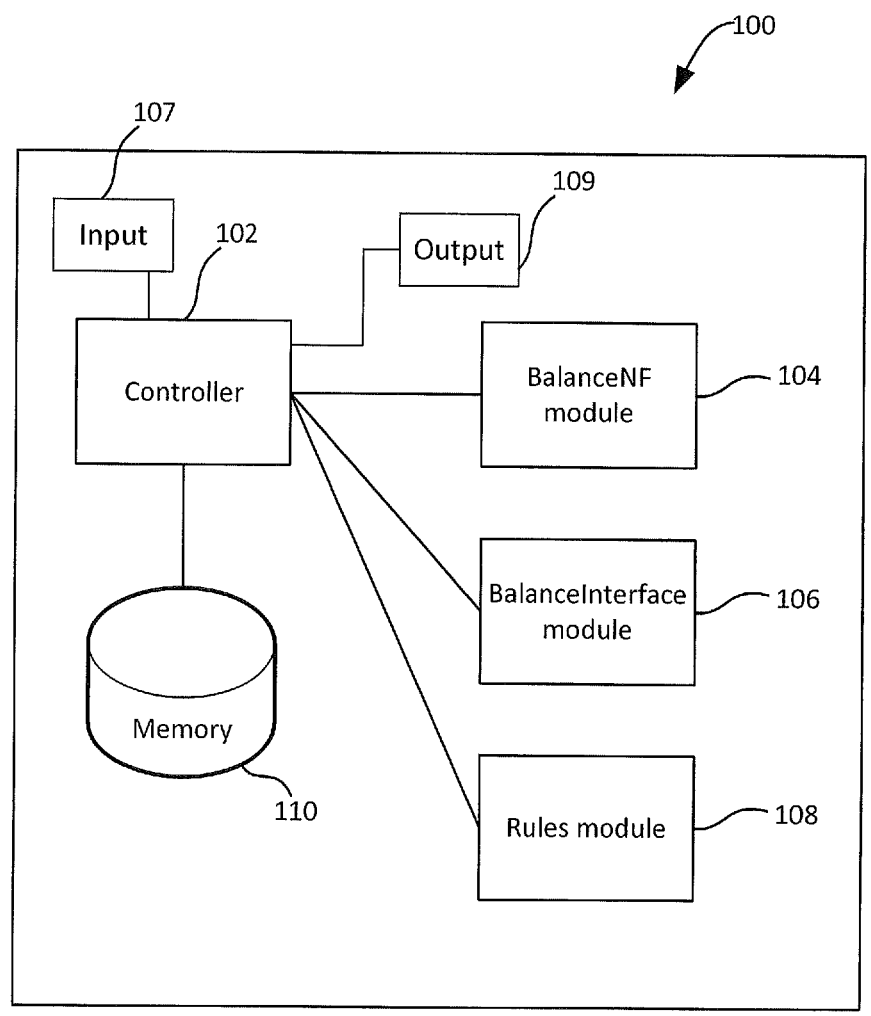
FIG. 2 illustrates a system for packet distribution according to an embodiment.

FIG. 2 illustrates a system 100 for packet distribution. The system 100 may include a controller 102, a balance using network function (BalanceNF) module 104, a balance using LAG (BalanceInterface) module 106, a Rules module 108 and a memory component 110. There will also be input 107 and output 109 modules for receiving data and for sending data.

Initially, the controller 102 receives a packet via the input and determines a packet value. The packet value may be based on a hash table and the packet value may be determined based on a hash of the packet criteria, for example the packet contents, the destination address, or the like. The packet value may also be constrained by various packet considerations, for example, the value assigned to the other packets in a particular packet flow, the network functions to be applied to the packet, and the like.

The controller 102 further determines if there are any LAGs in relation to the packet path. The controller 102 determines which module should process the packet, by determining a variance associated with the packet as detailed herein. The BalanceNF module 104 may by assigned the packet if the variance is less than a predetermined threshold while the BalanceInterface module 106 may be assigned the packet if the variance is greater than the predetermined threshold. The controller 102 may also create and update a rule table, for example via the Rules module 108.

In some cases, the controller 102 may determine the network function instance to associate with the packet if it is determined that there is a tie result from both the BalanceNF module 104 and the BalanceInterface module 106.

The memory component 110 is configured to store data related to the system for packet distribution, for example, a rules table, policy associated with the packets, constraints associated with packet flows, predetermined threshold(s), variance values, and the like.

If a new network function instance is detected by the controller 102 of the system, the Rules module 108 may initiate a rebuilding of the rule table using the updated information. This updated rule table may then be pushed to or distributed to various load-balancing processing units in communication with the system 100. The rule table may be used in the determination of the hash value for a packet.

The controller 102, further communicates with a Network Processing Unit (NPU) or other load-balancing device in order to provide instructions in relation to the network function instance and LAG associated with the packet, based on the rule table and the hash to determine the packet value. In particular, the controller 102, may receive a set of network function instances and weights associated with each network function instance. The controller 102 may query the network to determine the set of network function instances and weights, or this information may be provided by, for example, a network operator. The controller may also receive information related to a set of connecting switches, a set of NPUs, and a topology of the network, for example, how the NPUs, switches, NFIs are connected including the LAGs connecting these elements.

The BalanceNF module 104 may receive input from the controller 102 or may query the memory component 110 to determine the set of network function instances and the weights associated with each of the network function instances. The BalanceNF module 104 may further receive a packet value from the controller 102 for the packet to be distributed. The BalanceNF module 104 determines the network function instance from the provided set of network function instances or may determine there is a tie between a plurality of network function instances.

The BalanceInterface module 106 receives input from the controller 102 or may query the memory component to determine the set of network function instances, the weights of each network function instance from the set of network function instances, the set of connecting switches and the topology of the network. The BalanceInterface module 106 may also receive a packet value form the controller 102 for the packet which is to be distributed. The BalanceInterface module 106 determines the network function instance from the provided set of network function instances or determines whether there is a tie between a plurality of network function instances.

In some cases, several systems for packet distribution may be included in a network in order to balance multiple network function instances in serial.

Figure 3:
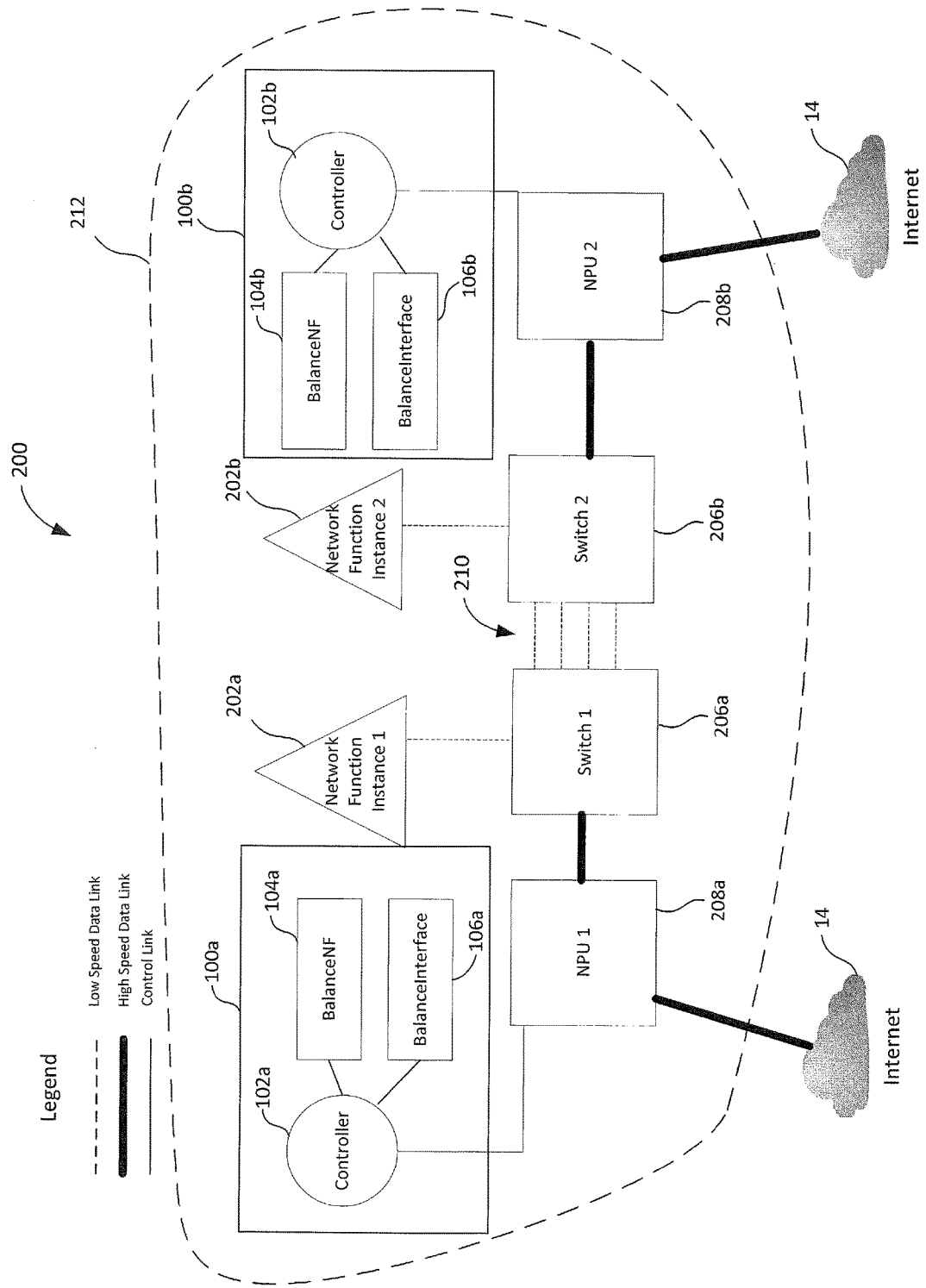
FIG. 3 illustrates an example deployment of the system for packet distribution according to an embodiment.

FIG. 3 illustrates a deployment 200 with two network function instances 202a and 202b, two load-balancers 100a and 100b, and two switches 206a and 206b, forming a cluster 212. The switches 206a and 206b receive packets from other switches, NPUs, or network function instances and redistribute packets to the switches, NPUs, or network function instances based upon the packet distribution determined by the system.

In this embodiment, the load-balancer functionality is provided by at least one Network Processing Unit (NPU) 208a and 208b, which intercepts data traffic and applies load-balancing rules, and the controllers 102a and 102b, which provide instructions to the NPUs with the load-balancing rules. The NPUs 208a and 208b receive packets from an access or core network or from switches 206a and 206b. The NPUs 208a and 208b may further receive the rule table from the controller 102. The NPUs 208a and 208b distribute the packets to switches, access or core networks.

In this example deployment, two NPUs 208a and 208b intercept traffic from the Internet 14 and distribute the traffic to the two network function instances according to decisions made by the controller 102. These decisions may be adapted or amended at runtime if the controller detects failures or new candidate network function instances. In a case where failures or new instances are detected, a new rule table may be created, via the Rules module 108, with the updated information.

Traffic from NPU 1 208a destined for network function instance 2 202b will cross a LAG connecting switch 1 206a and switch 2 206b. Traffic from NPU 2 208b destined for network function instance 1 202a will cross a LAG 210 connecting switch 1 206a and switch 2 206b. Network function instances 202a and 202b receive packets from switches and are intended to perform the network function on the packet prior to redistributing the packet to a switch. The traffic may be distributed over the links including the LAG 210. The switches, network function instances and LAG may be considered a cluster as previously described.

In an example, the LAGs may distribute traffic based on a simple modulus of the packet value by the number of links, which in this example is 4. The decision making process could be summarized in the following table:

| Packet Value | Interface |
| --- | --- |
| 0 | 0 |
| 1 | 1 |
| 2 | 2 |

| Packet Value | Interface |
| --- | --- |
| 3 | 3 |
| 4 | 0 |
| 5 | 1 |
| 6 | 2 |
| 7 | 3 |
| ... | ... |

Now suppose a naïve program loaded by the controller 102 assigned all even packet values to network function instance 1 202a, and all odd packet values to network function instance 2 202b. Its table would look something like this:

| Packet Value | Network Function |
| --- | --- |
| 0 | 1 |
| 1 | 2 |
| 2 | 1 |
| 3 | 2 |
| 4 | 1 |
| 5 | 2 |
| 6 | 1 |
| 7 | 2 |
| ... | ... |

Such a load-balancing rule table is reasonable when each network function instance has the same capacity. This distribution would send half the traffic to one network function instance, and half to the other.

Now consider a stream of traffic containing a uniformly random distribution of traffic over the packet values. In a simplified example, the system may include the subset of values 0 through 7, knowing that they are representative of an entire set due to a repeating pattern. Further, in this simplified example, the traffic can be considered from the perspective of NPU 1 208a.

NPU 1 208a will send all traffic destined to network function 2 202b over the links 210 connecting switch 1 206a to switch 2 206b. This means that this traffic will be subject to the distribution provided in the above tables. Note how only odd packet values will be sent, which implies that half of the links will not be used at all.

In this case, if all four links are required for scale, then the system cannot function as designed. In some cases, changing the LAG distribution method may not be an option. A different load-balancing rule table may be required. For example, the hardware providing the LAG may not give other options, or the possible options may use packet data which does not vary at all in the given network.

A correlation between the decision made by the system 100 and a decision made by the switch is intended to address this problem. The system 100 may use two processes to build a rule table as follows. In this example, the processes are referred to as:

BalanceNF: For a given packet value, choose the least loaded network function instance. Tie break by choosing the one with the lowest load added, and may be performed by the BalanceNF module 104. Alternatively, the tie break can be performed by choosing the one with the highest capacity.

BalanceInterface: For a given packet value, choose the network function which would lead to the packet value being assigned to the least loaded interface of a LAG out of the interfaces loaded by the given packet value.

The load placed on a network function instance by a given packet value is determined by the weight of the network function instance. The higher the weight, the less the load for a given packet value. For example, the load placed on a network function instance by a single packet value may be the maximum, or highest, weight out of all network function instances divided by the weight of the network function instance. In a specific example, suppose 3 network function instances, A, B and C each have a respective weight of 10, 10 and 20. Then, the load added by a packet value to A and B will be 20/10=2, whereas for C it will be 20/20=1. That is, for every packet value assigned to A or B, two may be assigned to C. It is intended that the weight of a network function instance reflects its relative capacity compared to the other network function instances in the set of network function instances. The BalanceInterface process may be performed by the BalanceInterface module 106.

In some cases, a tie breaking rule may be set, for example use BalanceNF in a tie. It will be understood that the process may be referred to differently. In other cases, the controller 102 may determine a tie breaking rule.

Three or more processes could be used to load balance, including a tiebreak process if desired. If a process cannot determine a unique destination network function instance, the process may forward the request to a process of lower priority, until one replies with an answer. The order of processes may determine which have a greater role in the overall load-balancing. For example, in one case, the first process is intended to have more impact while the last process may have the least impact on the overall load-balancing.

The load on a resource is defined as the number of packet values assigned to it, and may be modified by per-resource factors such as weight. The system 100 iterates over each possible packet value, running one of the two functions. Which function the system 100 uses depends on the maximum variance in the load for a given resource class. A resource class is either the set of network function instances, or the set of links within the LAG, sometimes referred to as interfaces, on a given switch.

The variance in the load between two resources in a class is the absolute value of the difference in the load between the two divided by the greater value of the two and may be determined by the controller 102. If all resources have a load of zero, then the variance is zero. Thus, the maximum variance for a given resource class is defined as the maximum of the variance for all possible combinations of resources in the class.

For example, suppose that the 4 links (from 0 to 3) each have 1, 2, 3 and 4 packet values assigned. The variance between link 0 and link 3 is (4−1)/4=0.75. Therefore, in this example, 0.75 is the maximum variance.

If the maximum variance is determined to be greater than a threshold, say 0.5, then the system uses BalanceInterface module 106 to load-balance the packet. Otherwise the system uses BalanceNF module 104 to load-balance the packet.

In some embodiments, a valid range of thresholds may be between 0 and 1. In this example, a threshold of 0 means thatBalanceInterface should always be favoured—balancing across LAGs is more important. A threshold of 1 means that BalanceNF should always be favoured—balancing across network function instances is more important. A lower threshold would typically be used when LAGs are a greater bottleneck to the traffic flow than network function instances. For example, in experimentation, it was found that a threshold value of 0.25 was appropriate based on testing where the size of LAGs is constrained, and therefore the LAGs are somewhat of a bottleneck to the overall network.

In a specific example, this method may be applied to the 8 packet values in the two element case. To start, no destinations are assigned any packet values, nor are any links so the loads and maximum variances are all 0. Thus the load-balancer will start by requesting assignments from the BalanceNF module 104.

There are three resource classes. The first, called Destinations contains all network function instances. The second, Switch1, contains the interfaces on switch 1, and the third, Switch2, contains the interfaces on switch 2.

1. Packet Value 0→BalanceNF( )→Destination 1
2. MaxVariance(Switch1)=0
3. MaxVariance(Switch2)=1 (because value 0 going to destination 1 hits interface 0)
4. Packet Value 1→BalanceInterface( )→Destination 2 (Interface 1 has no load yet for either Switch1 or Switch2, so use BalanceNF).
5. MaxVariance(Switch1)=1
6. MaxVariance(Switch2)=1
7. Packet Value 2→BalanceInterface( )→Destination 1 (Interface 2 has no load yet for either Switch1 or Switch2, so use BalanceNF).
8. MaxVariance(Switch1)=1
9. MaxVariance(Switch2)=1
10. Packet Value 3→BalanceInterface( )→Destination 2 (Interface 3 has no load yet for either Switch1 or Switch2, so use BalanceNF).
11. MaxVariance(Switch1)=1
12. MaxVariance(Switch2)=1
13. Packet Value 4→BalanceInterface( )→Destination 2 (Interface 0 has load 0 in Switch1, and load 1 in Switch2. Choose Destination 2, which would add load to Switch1).
14. MaxVariance(Switch1)=1
15. MaxVariance(Switch2)=1
16. Packet Value 5→BalanceInterface( )→Destination 1 (Interface 1 has load 1 in Switch1, and load 0 in Switch2. Choose Destination 1, which would add load to Switch2).
17. MaxVariance(Switch1)=1
18. MaxVariance(Switch2)=1
19. Packet Value 6→BalanceInterface( )→Destination 2 (Interface 2 has load 0 in Switch1, and load 1 in Switch2. Choose Destination 2, which would add load to Switch1).
20. MaxVariance(Switch1)=0
21. MaxVariance(Switch2)=1
22. Packet Value 7→BalanceInterface( )→Destination 1 (Interface 3 has load 1 in Switch1, and load 0 in Switch2. Choose Destination 1, which would add load to Switch2).
23. MaxVariance(Switch1)=0
24. MaxVariance(Switch2)=0
25. Packet Value 8→BalanceNF( ) . . .

The resulting load-balancing rule table is as follows:

| Packet Value | Network Function |
|---|---|
| 0 | 1 |
| 1 | 2 |
| 2 | 1 |
| 3 | 2 |
| 4 | 2 |
| 5 | 1 |
| 6 | 2 |
| 7 | 1 |
| ... | ... |

Figure 4:
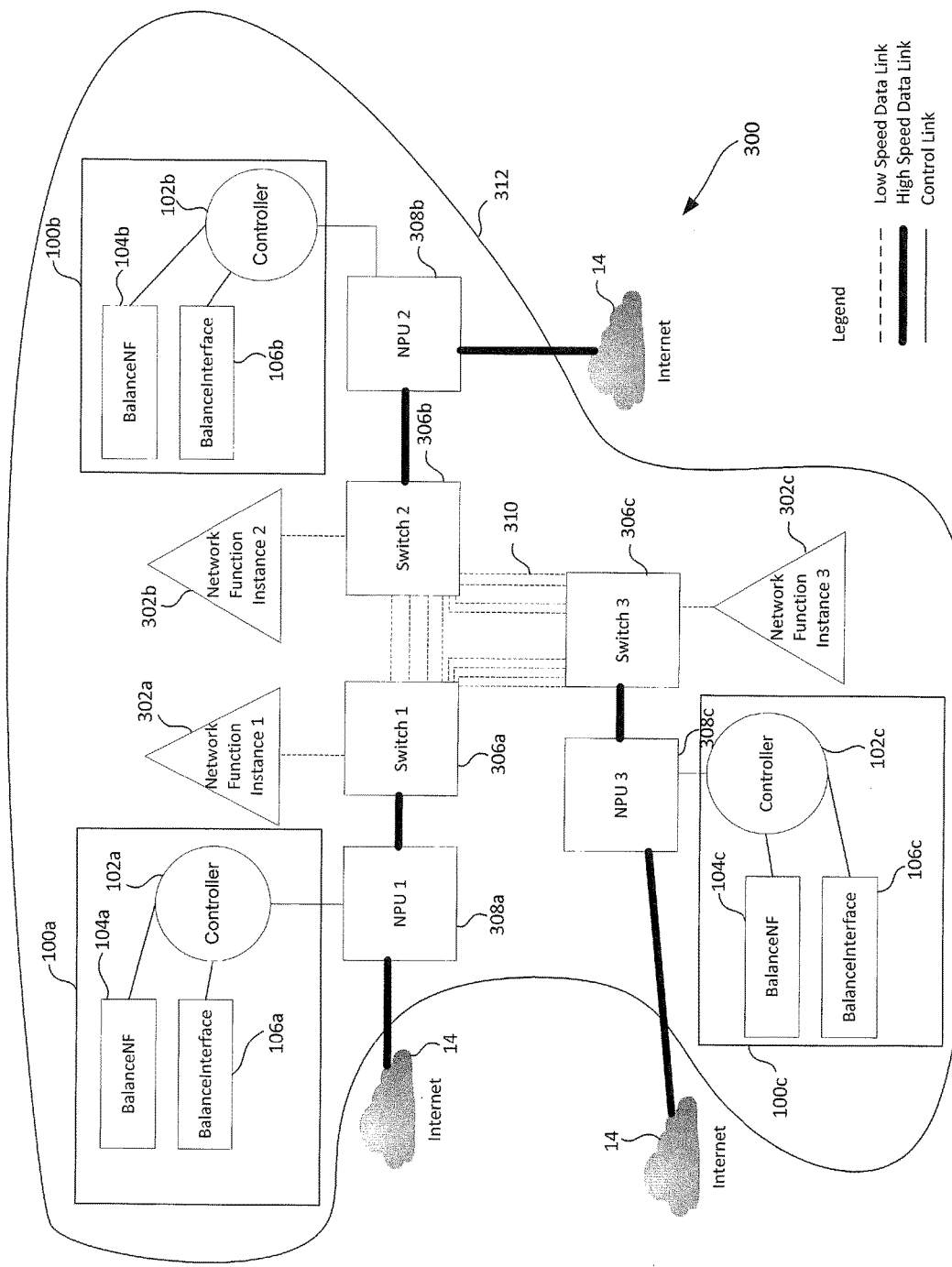
FIG. 4 illustrates an example deployment of the system for packet distribution according to another embodiment.

FIG. 4 illustrates another example deployment. As with the previous example deployment, FIG. 4 illustrates network processing units (NPUs) 308*a*, 308*b*, and 308*c* connected to the Internet 14 via a high speed data link. The NPUs 308*a*, 308*b* and 308*c* are each connected to one of a plurality of switches 306*a*, 306*b*, 306*c* and are controlled by the systems 100*a*, 100*b* and 100*c* and form a cluster 312. Although the systems 100*a*, 100*b*, and 100*c* are shown separately, in some cases a single system may control a plurality of NPUs. In some other cases, the system may be distributed and hosted on a plurality of network devices.

The three switches 306*a*, 306*b* and 306*c*, are each connected to one another with four links 310 in a LAG. However, unlike in the two element deployment, as shown in FIG. 3, a network function instance 302*c* may have a different capacity than the remaining two network function instances 302*a* and 302*b*. Network function instance 3 302*c* may have twice the capacity of network function instance 1 302*a* and network function instance 2 302*b*. For every packet value assigned to it, its load increases by 1. Network function instance 1 302*a* and network function instance 2 302*b* both have their load increased by 2 for each packet value assigned to them. The switches may be connected via links in a LAG, which generally tend to be lower speed data links.

In this example, the system may distribute IP packets in a slightly different manner than in the example of FIG. 3 shown above. BalanceNF module 104 may include a further tie-break by favouring network function instances with a higher capacity. In this case, a maximum variance threshold of greater than 0.5 is being used to determine whether or not to request assignments from the BalanceNF module 104. The table below is an example that contains a row for each packet value, along with the load on each and the decision made for that particular value. This illustrates the single-pass nature of the system and method disclosed herein.

| Packet Value | NF1 | NF2 | NF3 | SW1, 2 | SW1, 3 | SW2, 1 | SW2, 3 | SW3, 1 | SW3, 2 | Dest NF |
|---|---|---|---|---|---|---|---|---|---|---|
| 0 | 0 | 0 | 0 | 0 | 0 | 0 | 0 | 0 | 0 | 3 |
| 1 | 0 | 0 | 1 | 0 | 1 | 0 | 1 | 0 | 0 | 1 |
| 2 | 2 | 0 | 1 | 0 | 1 | 1 | 1 | 1 | 0 | 2 |
| 3 | 2 | 2 | 1 | 1 | 1 | 1 | 1 | 1 | 1 | 3 |
| 4 | 2 | 2 | 2 | 1 | 1 | 1 | 1 | 1 | 1 | 1 |
| 5 | 4 | 2 | 2 | 1 | 1 | 1 | 1 | 1 | 1 | 3 |
| 6 | 4 | 2 | 3 | 1 | 1 | 1 | 1 | 1 | 1 | 3 |
| 7 | 4 | 2 | 4 | 1 | 0 | 1 | 0 | 1 | 1 | 2 |
| 8 | 4 | 4 | 4 | 1 | 0 | 1 | 0 | 1 | 1 | 2 |

-continued

| Packet Value | NF1 | NF2 | NF3 | SW1, 2 | SW1, 3 | SW2, 1 | SW2, 3 | SW3, 1 | SW3, 2 | Dest NF |
|---|---|---|---|---|---|---|---|---|---|---|
| 9 | 4 | 6 | 4 | 1 | 0 | 1 | 0 | 1 | 1 | 2 |
| 10 | 4 | 8 | 4 | 0 | 0 | 1 | 0 | 1 | 0 | 1 |
| 11 | 6 | 8 | 4 | 0 | 0 | 1 | 0 | 1 | 0 | 1 |
| 12 | 8 | 8 | 4 | 0 | 0 | 0 | 0 | 0 | 0 | 3 |
| 13 | 8 | 8 | 5 | 0 | 0.5 | 0 | 0.5 | 0 | 0 | 3 |
| 14 | 8 | 8 | 6 | 0 | 0.5 | 0 | 0.5 | 0 | 0 | 3 |
| 15 | 8 | 8 | 7 | 0 | 0.5 | 0 | 0.5 | 0 | 0 | 3 |
| 16 | 8 | 8 | 8 | 0 | 0 | 0 | 0 | 0 | 0 | 3 |
| 17 | 8 | 8 | 9 | 0 | 0.33 | 0 | 0.33 | 0 | 0 | 1 |
| 18 | 10 | 8 | 9 | 0 | 0.33 | 0 | 0.33 | 0.5 | 0 | 2 |
| 19 | 10 | 10 | 9 | 0.5 | 0.33 | 0.5 | 0.33 | 0.5 | 0.5 | 3 |
| 20 | 10 | 10 | 10 | 0.5 | 0.33 | 0.5 | 0.33 | 0.5 | 0.5 | 3 |
| 21 | 10 | 10 | 11 | 0.5 | 0.5 | 0.5 | 0.5 | 0.5 | 0.5 | 1 |
| 22 | 12 | 10 | 11 | 0.5 | 0.5 | 0.66 | 0.5 | 0.66 | 0.5 | 1 |
| 23 | 14 | 10 | 11 | 0.5 | 0.5 | 0.66 | 0.5 | 0.66 | 0.5 | 1 |
| 24 | 16 | 10 | 11 | 0.5 | 0.5 | 0.66 | 0.5 | 0.66 | 0.5 | 1 |
| 25 | 18 | 10 | 11 | 0.5 | 0.5 | 0.33 | 0.5 | 0.33 | 0.5 | 2 |
| 26 | 18 | 12 | 11 | 0.5 | 0.5 | 0.33 | 0.5 | 0.33 | 0.5 | 3 |

The following table shows the resulting assignment of packet values to each interface for each LAG represented by the SW LAG column. SW LAG X, Y represents the LAG connecting Switch X to Switch Y.

| SW LAG | Interface 0 | Interface 1 | Interface 2 | Interface 3 |
|---|---|---|---|---|
| 1, 2 | 8 | 9, 25 | 2, 18 | 7 |
| 1, 3 | 0, 12, 16, 20 | 5, 13 | 6, 14, 26 | 3, 15, 19 |
| 2, 1 | 4, 24 | 1, 17, 21 | 10, 22 | 11, 23 |
| 2, 3 | 0, 12, 16, 20 | 5, 13 | 6, 14, 26 | 3, 15, 19 |
| 3, 1 | 4, 24 | 1, 17, 21 | 10, 22 | 11 |
| 3, 2 | 8 | 9, 25 | 2, 18 | 7, 23 |

In the above example, the system 100 starts by assigning to the highest capacity destination, destination 3. However, the system 100 then switches to using BalanceInterface module 106 until packet value 12, where the link resources are well balanced. Then the system 100 switches back to using BalanceNF module 106, which is intended to make up for any imbalance on the network created by favouring BalanceInterface module 106.

It would be understood that a set of LAGs could be determined through various means. For example, the LAGs could be explicitly indicated by configuration or, the LAGs could be inferred through a discovery protocol. In another case, an assumption may be made whereby every switch is connected to every other by a single LAG in a mesh.

In general, the system 100 will progress in this manner adaptively dealing with imbalance in each resource class. However, as the number of packet values assigned increases, the relative imbalance decreases, so by the time the system has completed it is intended that no LAG or network function instance are at capacity while capacity remains on other LAGs or network function instances.

Typically the number of packets values involved varies from 256 upwards of 4096. In some cases, the number of packet values may be even larger depending on the hardware involved in the system. The method detailed herein is intended to only have a single pass through the set of values: the method may greedily choose the best destination for each packet. It is intended that no back tracking or second passes are required, ensuring that the system can update its state quickly in response to events, such as network function instance failures or the like.

Figure 5:
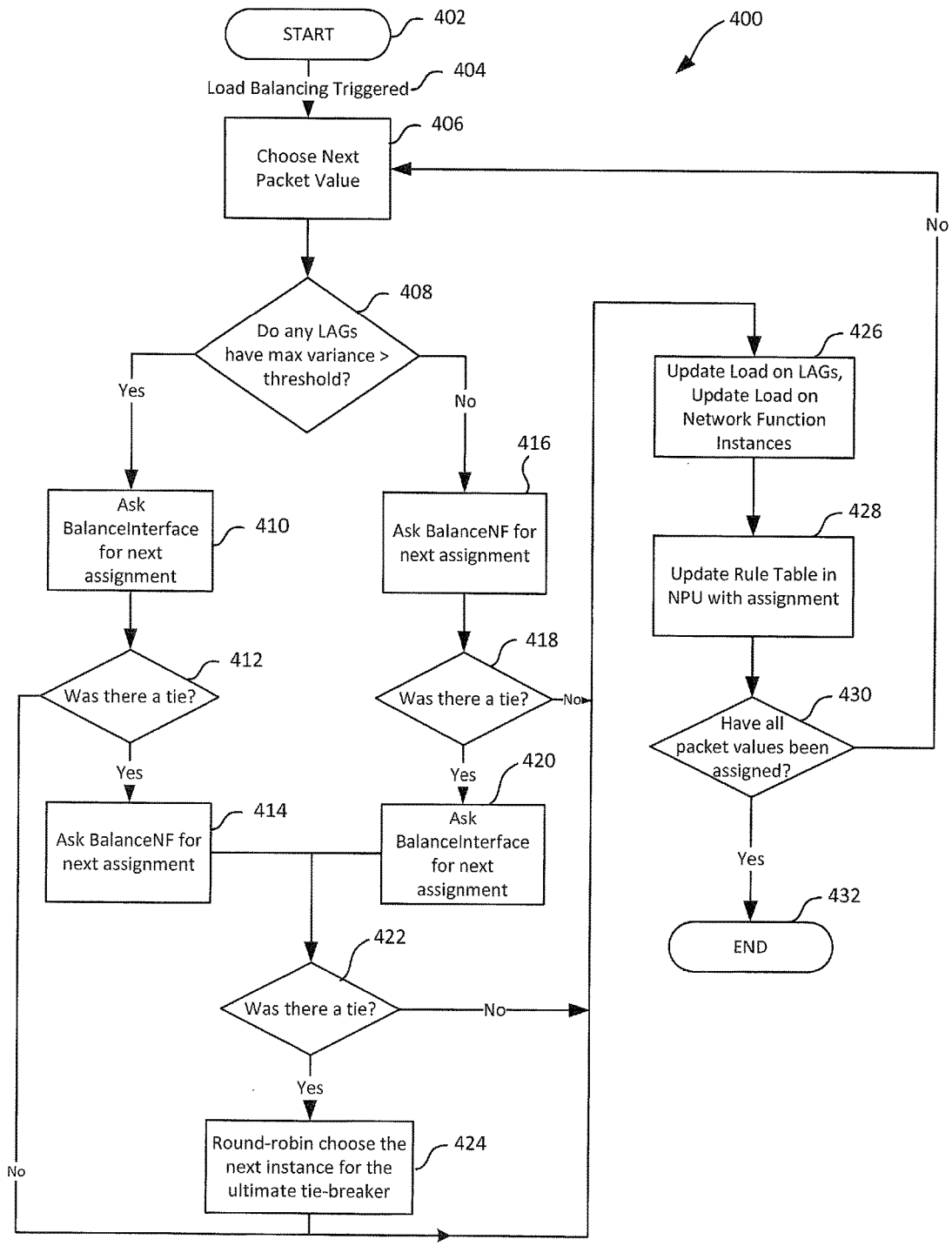
FIG. 5 illustrates a method for packet distribution according to an embodiment.

FIG. 5 illustrates a method 400 for packet distribution according to an embodiment. The controller 102 may initiate the method at 402, and load balancing may be triggered at 404. At 406, a packet value is selected for a packet intercepted by the system 100. The packet value may be based on, for example, the weights assigned to each of the network function instances. The weights may be assigned as part of the input to the controller 102 and may be assigned prior to the initiation of the method for packet distribution. In some cases, when the set of network function instances is provisioned (configuration, automatic discovery, or the like) a piece of data that may be associated with each network function instance may be their weight. Generally, this is determined by examining the capacity of each network function instance through, for example, experimentation or the like. It will be understood that the constraints associated with each packet are satisfied by the NPU and the LAGs when they are forwarding packets, which operate on data known to a) map to a particular flow or at the NPU or b) map to a particular subscriber IP (to which a particular flow would also map). Generally, the system defines a property of a packet which maps to exactly one instance/link in a LAG. That property is considered invariant for a given flow or subscriber IP and the constraints are therefore intended to be met.

At 408, the controller 102 determines whether any LAGs have a maximum variance that is less than or equal to the predetermined threshold. If the maximum variance is greater, the controller 102 asks the BalanceInterface module 104 for the next assignment, at 410. In some cases, the controller may ask the BalanceInterface module 104 for the next assignment if the maximum variance is greater than or equal to the predetermined threshold. The BalanceInterface module 104 determines where there is a tie for the next assignment at 412, and if a tie is determined, the BalanceNF module may be asked for the next assignment at 414.

If the maximum variance is less than or equal to the threshold then the controller 102 asks the BalanceNF module for the next assignment, at 416. At 418, it is determined if there is a tie and, if so, at 420 the BalanceInterface module 104 may be asked for the next assignment.

At 422, the BalanceInterface module 104 or BalanceNF module 105 determines whether there remains a tie. At 424, if a tie remains, a round-robin selection is made to determine the next instance for the distribution of the packet.

At 426, if there is no tie on any of the previous determinations, or after the round-robin selection, the load on the LAGs and the load on the network function instances is updated and stored in the memory component. At 428, the rule table is updated and the NPU is informed of the assignment.

At 430, the controller 102 determines whether all of the packet values have been assigned, if so, at 432, the method is concluded until the load balancing is triggered again. Otherwise, if there are packet values remaining, the method 400 loops to select a next packet value at 406.

Figure 6:
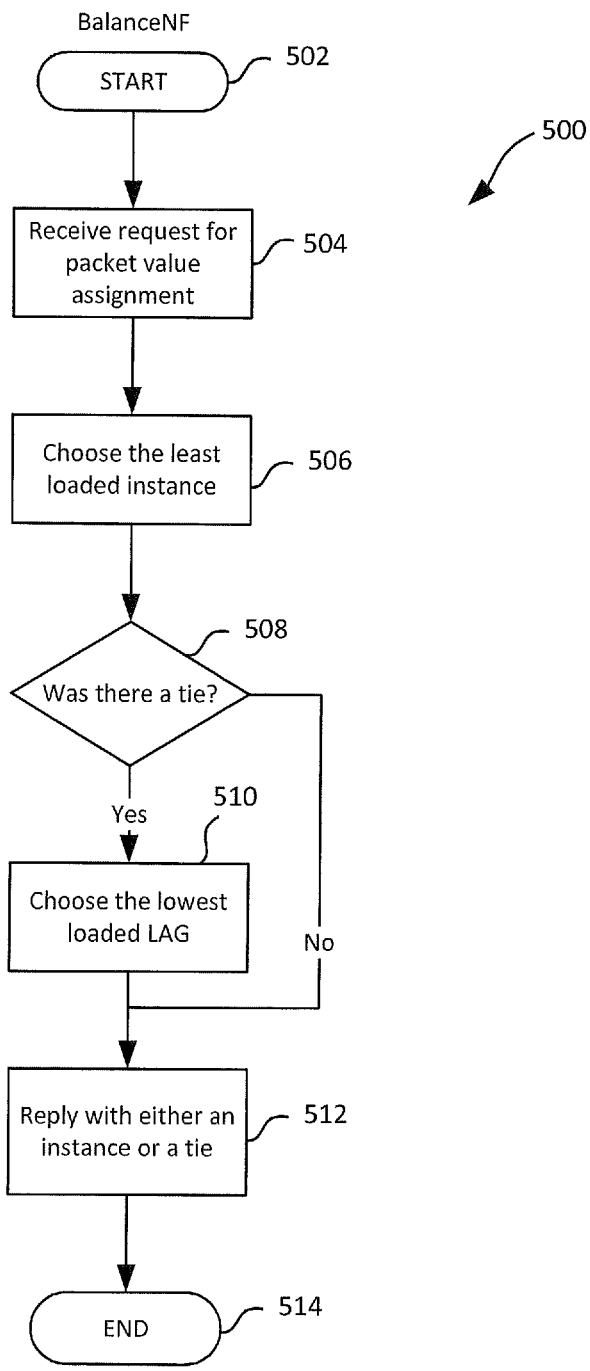
FIG. 6 illustrate a method for balancing network function instances according to an embodiment.

FIG. 6 illustrates a method 500 for packet distribution by the BalanceNF module. At 502, the method is commenced and at 504 the BalanceNF module 104 receives a request for packet value assignment. At 506, the BalanceNF module 104 selects a network function instance meeting predetermined criteria such as the least loaded network function instance to receive the packet. At 508, it is determined whether there was a tie of least loaded network function instances. At 510, if there is a tie, the network function instance with the highest capacity or the lowest loaded LAG is selected.

At 512, if there was no tie, or if the highest capacity network instance or the lowest loaded LAG is selected, the BalanceNF module 104 will inform the controller 102 of the selection. If there remains a tie, for example the two tied network function instances have the same capacity, the BalanceNF module 104 will return a tie to the controller 102. At 514, the method is completed and the controller calls upon the BlanaceNF module 104 to begin the method again.

Figure 7:
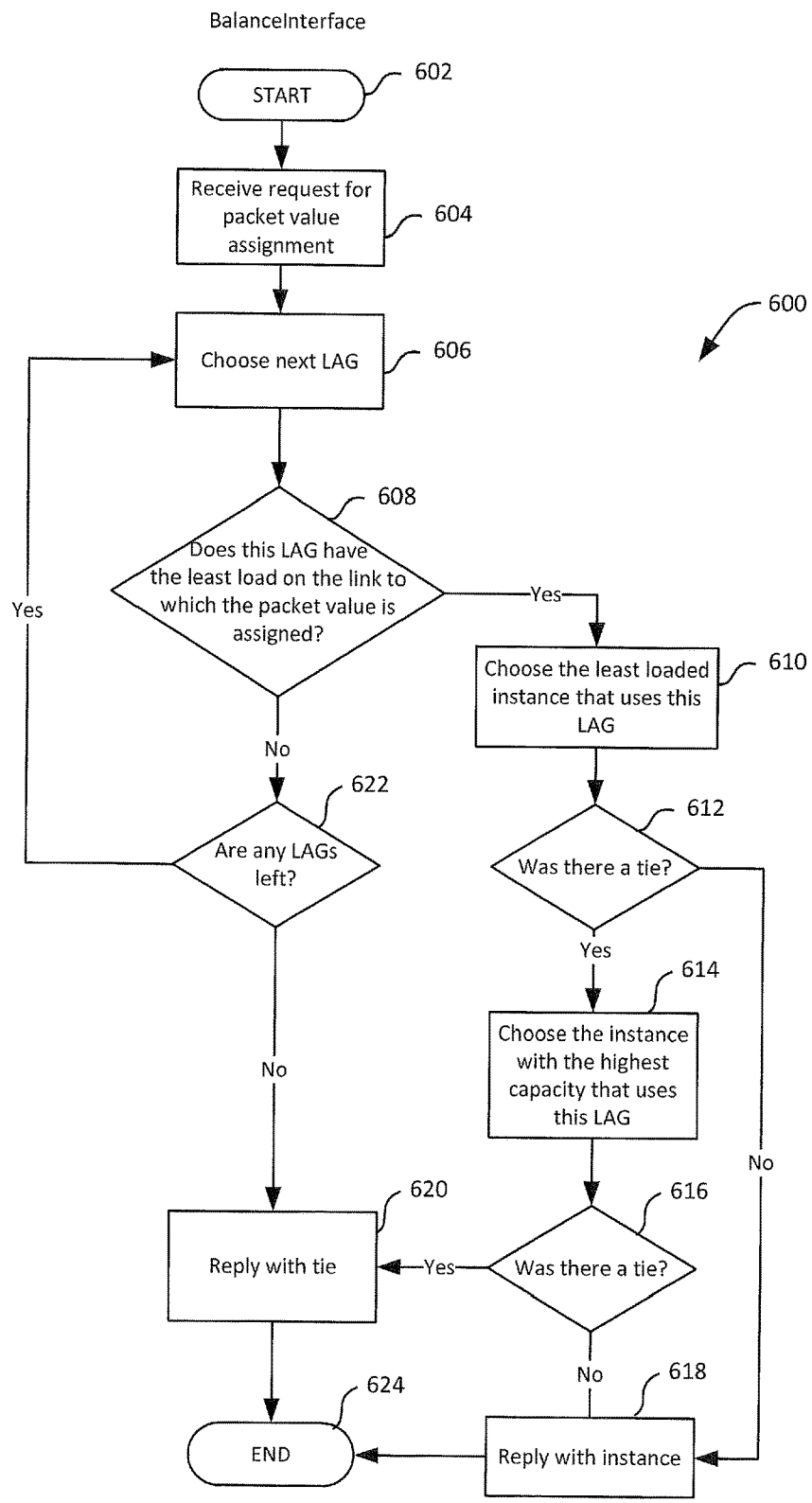
FIG. 7 illustrates a method for balancing interfaces according to another embodiment.

FIG. 7 illustrates a method for the BalanceInterface module 106. At 602, the method is started and, at 604, a request for packet value assignment is received. At 606, the BalanceInterface module 106 selects the LAG. At 608, the Balance Interface module 106 determines whether the selected LAG meets a predetermined criteria such as the least load on the link to which the packet is assigned. Using knowledge of the LAG's distribution method, the BalanceInterface module 106 determines to which link the packet value will be assigned. If that link has the least load—the least number of packet values assigned—when compared to that link on all other LAGs, then that link is chosen.

At 610, the least loaded instance associated with the selected LAG is picked. At 612, the BalanceInterface module 106 determines whether there is a tie. If there is a tie, at 614, the instance with the highest capacity that uses the selected LAG is picked. At 616, it is determined whether there is another tie. If there was no tie, or if there was no tie at 612, the BalanceInterface module 106 returns the network function instance and LAG selected to the controller, at 618, where the controller 102 updates the NPU with the assignment. If there is a tie at 616, the BalanceInterface module 106 will return a tie to the controller 102, at 620.

If, at 608, it is determined that the selected LAG does not have the least load, the BalanceInterface module 106 will determine if there are any LAGs left, at 622 If there are, the BalanceInterface module 106 will select the next LAG. If there are no LAGs remaining, the BalanceInterface module 106 will return a tie result to the controller 102. At 624, the method is ended until the controller 102 requests further input from the BalanceInterface module 106.

In some cases, the NPU may receive a rule table once the table has been fully updated. In other cases, the NPU may receive a per value update, as shown in FIGS. 5 to 7. In some cases, the NPU receiving the rule table after it has been fully updated may be more efficient than the per value update.

As described herein, the method for load balancing may allow for the load-balancer to quickly, in a distributed manner, converge on a set of load-balancing rules that fairly evenly distribute load across network functions with varying capacities, connected in a mesh using link aggregation groups.

It is intended that the system and method provided herein decrease the cost to deploy network functions through effective load-balancing, and allow scaling of network functions. Scaling of the network functions may be accomplished by distributing packets by statically mapping packet data to network functions using an NPU-driven load-balancer programmed by the controller 102 when, for example:
  Network function interfaces are connected to NPUs through two Ethernet switches, or
  Network function interfaces are connected to NPUs through more than two Ethernet switches In the preceding description, for purposes of explanation, numerous details are set forth in order to provide a thorough understanding of the embodiments. However, it will be apparent to one skilled in the art that these specific details may not be required. In other instances, well-known structures and circuits are shown in block diagram form in order not to obscure the understanding. For example, specific details are not provided as to whether the embodiments described herein are implemented as a software routine running on a processor, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A method for packet distribution across a set of network function instances associated with a packet and a plurality of links within at least one link aggregation group (LAG) on a network comprising:
  receiving the packet from a traffic flow;
  determining at least one network function associated with the packet;
  determining at least one LAG associated with the packet;
  determining a variance associated with a plurality of links within the at least one LAG;
  determining whether the variance is above a pre-determined threshold;

wherein, if the variance is above the threshold, determining a path for the packet based on capacity associated with each of the plurality of links;
otherwise determining the path based on capacity of each of a plurality of network function instances associated with the at least one network function, wherein determining the path based on capacity of each of the plurality of network function instances comprises:
determining a load for each of the plurality of network function instances;
determining whether there is a tie for a least loaded network function instance; and
if there is a tie, selecting the network function instance with a higher capacity;
otherwise selecting the network function instance with the least load.

2. The method of claim 1 wherein if the variance is less than or equal to the pre-determined threshold:
associating the packet with one of the network function instances.

3. The method of claim 1 further comprising:
assigning weights to each of the plurality of network function instances.

4. A method according to claim 1 wherein the path for the packet comprises a network function instance associated with the packet.

5. A method according to claim 1, wherein the determining a path for the packet based on capacity associated with each of the plurality of links comprises:
selecting a LAG of the at least one LAGs;
determining whether the selected LAG is least loaded;
if the selected LAG meets a predetermined criteria, determining if there is a tie of a least loaded network function instance among the network function instances associated with the selected LAG;
if there is a tie, selecting a highest capacity network function instance associated with the selected LAG;
if there is no tie, selecting a least loaded network function instance associated with the selected LAG;
if the selected LAG does not meet the predetermined criteria, selecting a new LAG if there is more than one LAG.

6. A method according to claim 1, further comprising:
determining any constraints associated with the packet.

7. Apparatus for packet distribution across a set of network function instances associated with a packet and a plurality of links within at least one link aggregation group (LAG) on a network comprising:
a controller for determining at least one network associated with a received data packet, determining at least one LAG associated with the received data packet, determining a variance associated with a plurality of links within the at least one LAG, and determining whether the variance is above a pre-determined threshold;
a balance-using LAG module for determining a path for the received data packet based on capacity associated with each of the plurality of links if the variance is above the pre-determined threshold; and
a balance-using network function module for determining the path based on capacity of each of a plurality of network function instances associated with the at least one network function if the variance is below a predetermined threshold, wherein determining the path based on capacity of each of the plurality of network function instances comprises:
determining a load for each of the plurality of network function instances;
determining whether there is a tie for a least loaded network function instance; and
if there is a tie, selecting the network function instance with a higher capacity;
otherwise selecting the network function instance with the least load.

8. The apparatus of claim 7 further comprising:
a rules module for rebuilding a rules table based on the determined path.

9. The apparatus of claim 7 further comprising:
a network processing unit associated with the controller, the network processing unit for receiving the data packet.

10. The apparatus of claim 7 further comprising:
a memory component.

11. A system for packet distribution across a set of network function instances associated with a packet and a plurality of links within at least one link aggregation group (LAG) on a network comprising:
a set of network processing units for receiving data packets;
a set of packet distribution apparatus, each of the set of packet distribution apparatus associated with one of the set of network processing units;
a set of switches connected to each other via LAGs; and
a set of network functions connected to the set of switches;
wherein each of the set of packet distribution apparatus includes:
a controller for determining at least one network function associated with a received data packet, determining at least one LAG associated with the received data packet, determining a variance associated with a plurality of links within the at least one LAG, and determining whether the variance is above a pre-determined threshold;
a balance-using LAG module for determining a path for the received data packet based on capacity associated with each of the plurality of links if the variance is above the pre-determined threshold; and
a balance-using network function module for determining the path based on capacity of each of a plurality of network function instances associated with the at least one network function if the variance is below a predetermined threshold, wherein determining the path based on capacity of each of the plurality of network function instances comprises:
determining a load for each of the plurality of network function instances;
determining whether there is a tie for a least loaded network function instance; and
if there is a tie, selecting the network function instance with a higher capacity;
otherwise selecting the network function instance with the least load.

12. The system of claim 11 wherein the set of network functions comprise a set of network function instances.

13. The system of claim 11 wherein each of the set of network processing units are connected to the set of switches via a high speed data link.

14. The system of claim 11 wherein the set of network processing units receive data packets from the Internet.

* * * * *